Aug. 29, 1933.  C. S. ASH  1,924,970
WHEEL
Filed Dec. 29, 1930
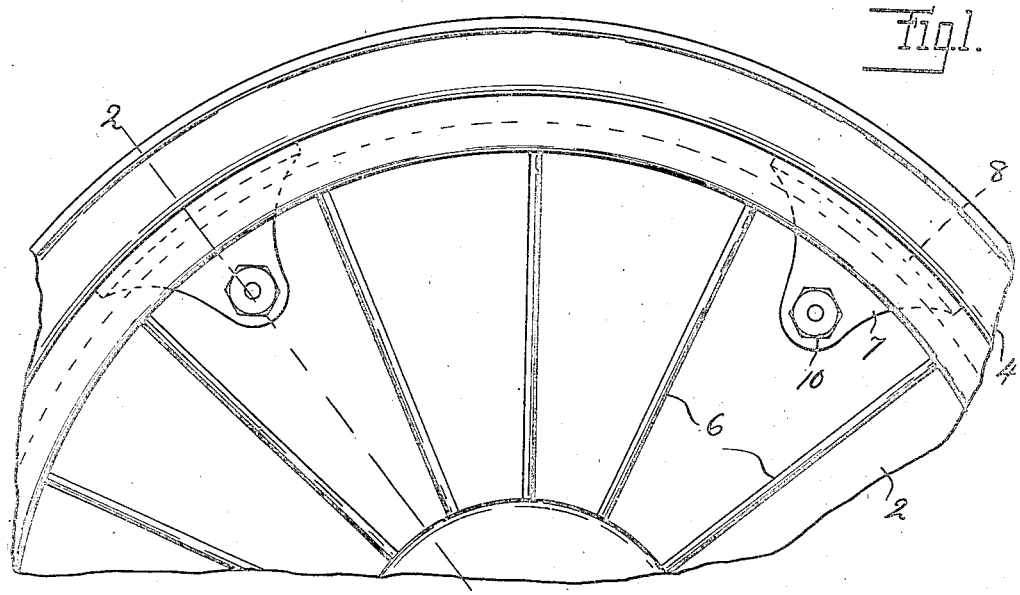
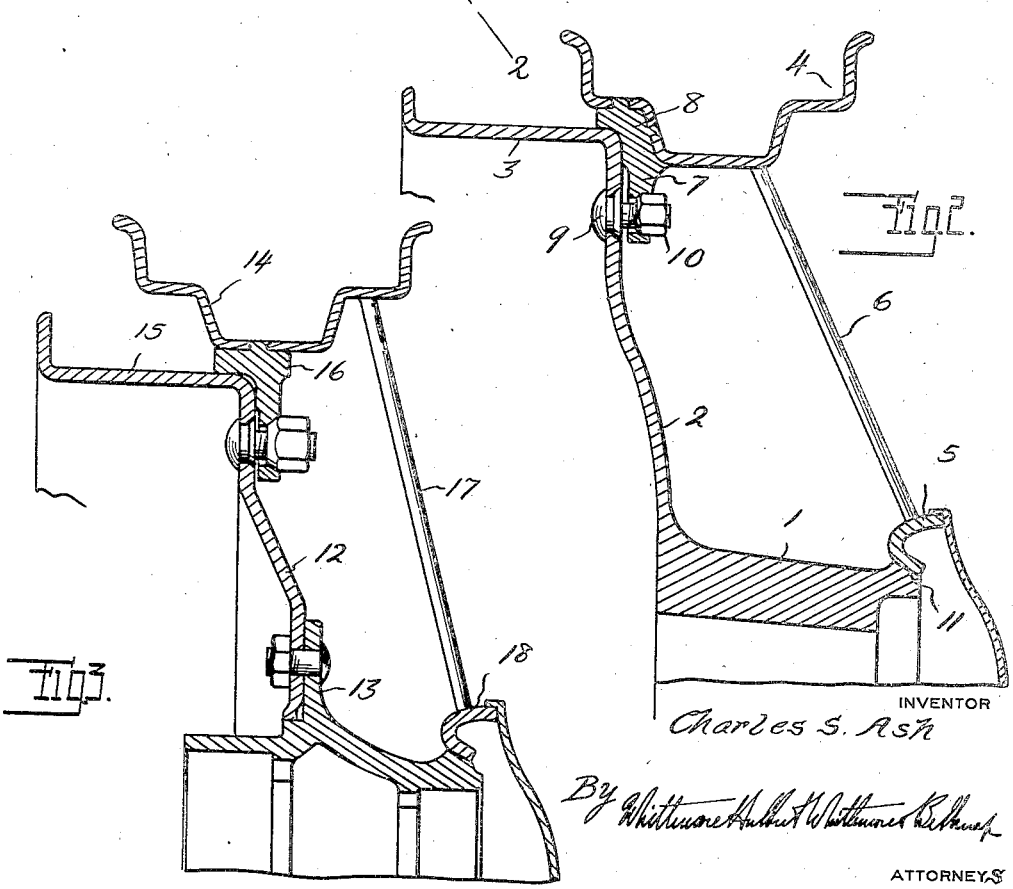
INVENTOR
Charles S. Ash
ATTORNEYS Patented Aug. 29, 1933

1,924,970

UNITED STATES PATENT OFFICE 1,924,970

WHEEL

Charles S. Ash, Birmingham, Mich., assignor to Kelsey-Hayes Wheel Corporation, Detroit, Mich., a corporation of New York Application December 29, 1930
Serial No. 505,374

1 Claim. (Cl. 301—11)

The invention relates to wheels and has for one of its objects to so construct a wheel that it is light in weight and yet possesses the necessary strength to safely withstand the usual stresses to which it may be subjected in use. Another object is to so construct the wheel that it is demountable and its means, such as wire spokes, connecting the rim and hub engaging member is placed under tension upon mounting the wheel upon the hub. These and other objects of the invention will be apparent from the following description and claim, taken in connection with the accompanying drawing, in which Figure 1 is a front elevation of a portion of a wheel showing an embodiment of my invention;

Figure 2 is a cross section on the line 2—2 of Figure 1;

Figure 3 is a view similar to Figure 2 showing another embodiment of my invention.

The embodiment of my invention illustrated in the present instance is the hub 1, which is adapted to be secured to a drive shaft of a motor vehicle, although it is apparent that this hub may be readily changed to mount the same upon the steering spindle of the motor vehicle. 2 is the web member upon the hub, it being shown as having at its periphery the brake flange 3.

The demountable wheel comprises the tire carrying rim 4, the hub engaging member 5, the wheel body member 6 connecting the rim and the hub engaging member and being preferably wire spokes, and the mounting and anchoring member 7. The rim is of the drop-center type with the base of its drop-center portion of smaller diameter than the diameter of the brake flange 3. The hub engaging member is a band of channel cross section through the outer flange of which extends the inner end portions of the spokes 6. The anchoring member comprises the angularly spaced lugs 8, which are fixed upon the rim as by being riveted thereto. These lugs have enlarged outer ends, the outer faces of which are shaped to engage the side wall of the drop-center portion of the rim and the lateral wall above and connecting into the side wall and the lower faces of which are shaped to engage the web member 2 and to extend over its periphery and engage the outer faces of the brake flange 3. The inner end portions of these lugs are shaped so that they are spaced from the web member 2 and these inner end portions are apertured for the passage of the securing bolts 9, which are fixed to and extend transversely of the web member and have threaded front ends for engagement by the securing nuts 10.

The construction is such that upon mounting the demountable wheel upon the hub the inner flange of the band 5 is first engaged with the tapered seat 11 upon the front end of the hub 1, after which the lugs 8 are engaged with the web member and upon tightening down the nuts 10 these lugs 8 and consequently the rim are moved axially inwardly relative to the hub, thereby tensioning the spokes 6.

In the construction shown in Figure 3, the web member 12 is mounted upon and secured by suitable means to the radial flange 13 of the hub. The tire carrying rim 14 has an internal diameter greater than the external diameter of the brake flange 15 and has secured to its base the lugs 16, which have portions extending over the brake flange and radially extending portions at the front side of the web member. These latter portions have their inner anchoring portions spaced laterally from the web member and apertured for the passage of the securing bolts. 17 are wire spokes between the lateral portion of the rim in front of the drop-center portion and the ring or band 18 engageable with the tapered shoulder at the front end of the hub.

From the above description, it will be seen that the construction of wheel is light and strong. It will also be seen that the wheel is reinforced against lateral distortion or distortion in an axial direction by the spokes. It will further be seen that the construction of wheel is such that the spokes are placed under tension when mounting the wheel upon the hub.

What I claim as my invention is:

In a vehicle wheel, the combination with a hub member and a web member thereon, of a demountable rim having an annular drop-center portion and lugs each having an outer portion engaging and secured to the rear side wall of said drop-center portion and the lateral wall connecting into the outer edge of said side wall, said outer portion extending over and being radially supported upon said web member, each of said lugs also having an inner portion extending at the side of said web member, and means detachably engaging said inner portions for detachably securing said rim to said web member.

CHARLES S. ASH.